Sept. 20, 1955 E. I. ANDERSON 2,718,552

NOISE CANCELLATION CIRCUIT

Filed May 26, 1951

INVENTOR
Earl I. Anderson
BY
[signature]
ATTORNEY

United States Patent Office 2,718,552
Patented Sept. 20, 1955

2,718,552

NOISE CANCELLATION CIRCUIT

Earl I. Anderson, Manhasset, N. Y., assignor to Radio Corporation of America, a corporation of Delaware Application May 26, 1951, Serial No. 228,443

1 Claim. (Cl. 178—7.5)

This invention relates to signal processing circuits, and more particularly to signal processing circuits designed to permit the passage only of those supplied signals having amplitudes falling below a predetermined amplitude level, without adversely affecting the waveforms of the signals so passed.

In one of its aspects the present invention is concerned with noise immunity in the synchronizing and Automatic Gain Control (AGC) circuits of television receivers.

A copending United States patent application of Jack Avins (RCA 34,199) Serial Number 226,712 filed May 16, 1951, discloses a circuit in which improved noise immunity is obtained by providing a noise inverter between the input and the output of a video amplifier. This noise inverter is designed to conduct signals when a noise pulse whose amplitude extends beyond the level of the synchronizing pulses is present at the input of the noise inverter, thus producing an inverted noise pulse which reverses the polarity of the noise pulse which would otherwise be present at the output of the video amplifier.

It is an object of this invention to provide a simplified circuit to prevent noise from interfering with the operation of the synchronizing circuits in a television receiver.

According to the present invention, improved noise immunity is obtained by providing, between the input and output of a video amplifier, a noise inverter comprising a unidirectional conduction device having an anode, a cathode, and a control electrode. Demodulated television signals are applied to the unidirectional conduction device through a connection from the output of the receiver's video detector to the cathode of the unidirectional conduction device. A biasing potential is applied to the control electrode of the unidirectional conduction device so that it will conduct only when a noise pulse whose amplitude extends beyond the amplitude level of the synchronizing pulse is present at its cathode. When conduction does occur, the unidirectional conduction device produces an inverted noise pulse which reverses the polarity of or cancels the noise pulse which would otherwise be present at the output of the video amplifier.

Figure 1:
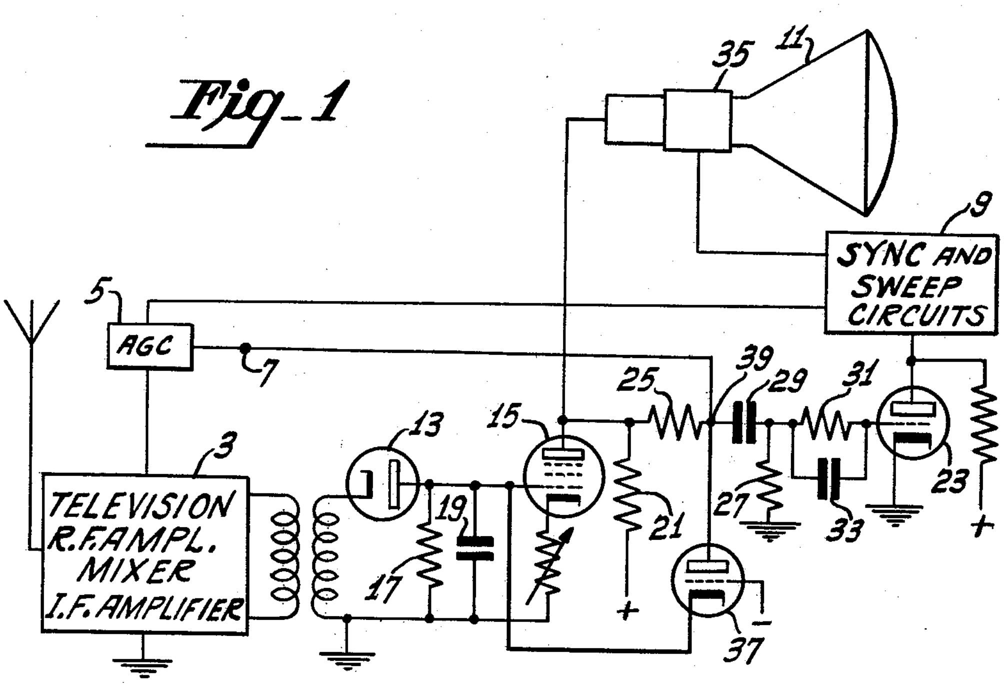
Figure 2:
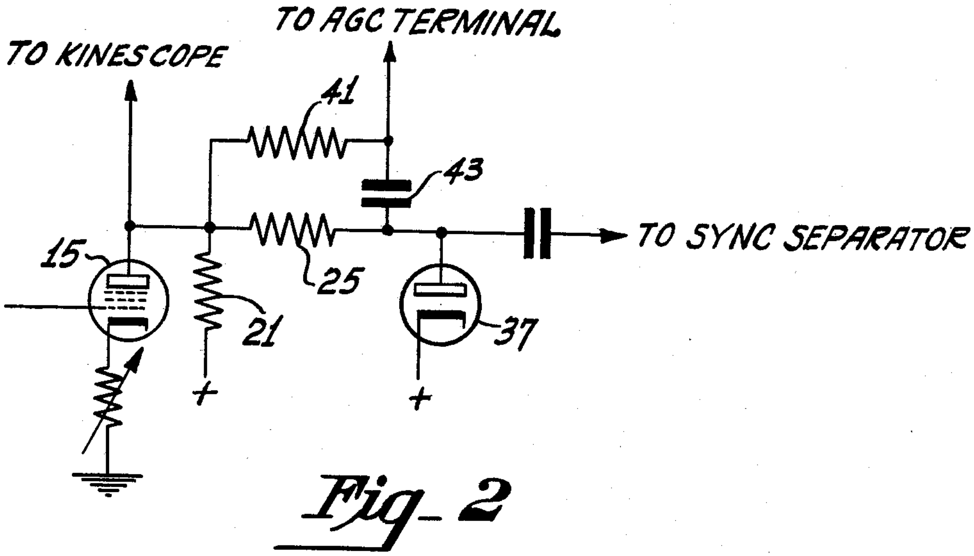

Other and incidental objects of the invention will be apparent to those skilled in the art from a reading of the following specification and an inspection of the accompanying drawings in which:

Fig. 1 shows by circuit diagram a television receiver employing an embodiment of the invention, and Fig. 2 shows also by circuit diagram a modified circuit employing the embodiment of Fig. 1.

Referring to the drawing there is shown a television receiver which includes an R.-F. amplifier, mixer and I. F. amplifier section 3, and an AGC circuit 5 having an input terminal 7. Details relating to these circuits as well as to the synchronizing and sweep circuits 9 and the kinescope 11, have not been shown, as they are well known to those skilled in the art.

The output signal of the video detector tube 13 is fed to the control grid of a video amplifier tube 15. Resistor 17 and capacitor 19 are associated with the video detector tube 13. The anode of amplifier tube 15 is connected to a source of positive potential through resistor 21, and to a synchronizing signal separator tube 23 through a resistor 25, a slow time constant circuit comprising resistor 27 and capacitor 29, and a fast time constant circuit comprising resistor 31 and capacitor 33. The anode of amplifier tube 15 is also connected to an electrode of kinescope 11. The output of the synchronizing signal separator tube 23 is connected to the sync and sweep circuits 9, which are connected to the deflection yoke 35 of kinescope 11.

In accordance with the invention the cathode of a noise inverter tube 37 is connected to the output of the video detector 13. The anode of the noise inverter tube 37 is connected to point 39, point 39 being the end of resistor 25 remote from the anode of tube 15. Resistors 21 and 25 serve as the plate load of the noise inverter tube 37.

The operation of the circuit is as follows: a negative biasing potential is applied to the control electrode of the noise inverter tube 37 so that it conducts only when noise pulses extending beyond synchronizing pulse height are present at the video detector circuit. When the noise inverter tube 37 conducts, it produces across resistor 25 a negative pulse which is in opposite phase to the positive noise pulse that will have reached this point through the video amplifier tube 15, and substantial cancellation will take place. This action does not require a critical balance between the two pulses: the negative noise pulse developed by the noise inverter tube 37 at its anode will generally exceed the positive noise pulse produced at the same point by the video amplifier. This will momentarily drive the grid of the sync separator tube 23 more negative than is necessary to obtain noise immunity. "White" noise pulses will generally be introduced by the noise inverter tube 37 at its anode, but these "white" pulses will be attenuated sufficiently when they reach the anode of the video amplifier so that "white" noise in the picture will not be observed when the noise inverter tube 37 conducts on noise peaks. The amount of attenuation provided increases as the ratio $$\frac{R25}{R21}$$

increases. This factor, together with the desirability of providing a high load resistance for the noise inverter tube 37, shows that resistor 25 should be as large as is consistent with acceptable sync compression at the grid of the sync separator.

Since impulse noise in general is random in amplitude, there will be noise components present at the video detector which (*a*) are smaller in amplitude than the cut-off bias on the noise inverter tube, (*b*) exceed the cut-off bias but do not come up to the level corresponding to zero bias, i. e., full conduction in the noise inverter tube (*c*) and finally those which exceed the zero bias condition for the noise inverter tube.

The noise inverter circuit is not operative for noise components in the (*a*) category. Fortunately, these components have relatively low energy content and therefore their effect on the signal-noise ratio of the sync signal is relatively small. To reduce the number of noise components which fall within this category the bias used on the noise inverter tube 37 should exceed the sync peak height by the smallest margin compatible with the prevention of conduction of this tube on the sync peaks.

To obtain maximum effectiveness for noise components falling in the (*b*) category, a high mu tube should preferably be used for the noise inverter tube 37. This will reduce the number of noise components which are unable to cause adequate conduction of the noise inverter tube 37.

The noise inverter circuit is fully operative for noise components in the (*c*) category.

The anode of the noise inverter tube 37 in Fig. 1 provides a noise immune point 39 which can be used to couple signal level information directly to the grid of a keyed AGC tube included in block 5. This arrangement provides additional noise immunity over and above that resulting from the keying action since the signal at point 39 is essentially free of noise in the sync region. The combined effect is to eliminate AGC "setup" on noise. AGC "setup" is a signal level established by the incoming signal to control the gain of the receiver.

When the grid of the keyed AGC tube is directly coupled to the anode of the noise inverter tube 37, the AGC system shows significantly reduced vulnerability to "setup" on noise. However, the receiver exhibits a strong tendency toward overload when it is switched from a weak to a strong signal. This comes about in the following manner: when the signal increases suddenly the level at the video detector increases before the AGC voltage can change. This causes the noise inverter tube to conduct and to cut off the keyed AGC tube. The receiver remains in this locked-out condition until the input signal is reduced.

To improve the action, the grid of the keyed AGC tube is returned to the plate of the video amplifier through a resistor 41 rather than to the noise-inverter plate. The enhanced AGC noise immunity is retained by adding a coupling capacitor 43 between the grid of the keyed AGC tube and the anode of the noise-inverter tube. This insures against lock-out when switching from a weak to a strong signal, without impairing the noise immunity of the sync circuits.

The following circuit values which are given below have been found to provide satisfactory operation with the circuits of Figs. 1 and 2. These values are given only by way of example, and the scope of applicant's invention should not be restricted thereto.

For Fig. 1:

Resistors 17 and 21=4,700 ohms
+Potential=+150 volts
—Potential=—6 volts
Tube 37=½ 12AX7
Resistor 25=27,000 ohms
Resistor 27=4.7 megohms
Resistor 31=470,000 ohms
Tube 23=½ 12AX7
Capacitor 29=.002 microfarad
Capacitor 33=150 micromicrofarads For Fig. 2:

Resistor 25=39,000 ohms
Resistor 41=39,000 ohms
Capacitor 33=.02 microfarad

What is claimed is:

In a superheterodyne television receiving system the combination of: a source of intermediate frequency television signal, said signal comprising a carrier signal amplitude modulated by a composite television signal having a synchronizing pulse component defined by peak carrier excursions of a fixed percentage of carrier modulation, said intermediate frequency television signal fortuitously including noise excursions exceeding the amplitude of said peak carrier excursions; a first signal amplifier means including a first vacuum tube having at least a control electrode, cathode and anode, and including an anode power supply means connected with said cathode, and an output circuit means connected between said anode and said power supply means, said output circuit means including a resistor of relatively low value connected to conduct anode current to said vacuum tube; a first diode demodulator input circuit means of a given demodulation polarity for said first vacuum tube connected with said signal source, and between said cathode and said control electrode for supplying demodulated signal to said amplifier representing a carrier modulation envelope of given polarity; a kinescope picture reproducing means; means operatively coupling said kinescope picture reproducing means to said vacuum tube anode; a synchronizing signal responsive deflection circuit means operatively associated with said kinescope picture reproducing means, said deflection circuit means having an input signal terminal; a second signal amplifier means including a second vacuum tube having at least a control electrode, cathode and anode; a first current conducting isolating impedance means including a resistance component of a value substantially greater than said low value resistor included in said first vacuum tube output circuit; means direct current connecting said isolating impedance means between said second vacuum tube anode and said first vacuum tube anode; means connecting said first vacuum tube control electrode with said second vacuum tube cathode for cathode driving said second vacuum tube to develop a signal at said second tube anode representing demodulation of said television signal carrier of opposite polarity to signals appearing on said first vacuum tube anode; means establishing said second vacuum tube control electrode at a substantially fixed operating potential of a value rendering said second amplifier means ineffective for signals falling below the amplitude of said synchronizing pulse component; means included in said first and second amplifying means for relating the signal gains thereof to produce signal cancellation across said isolating impedance; and means coupling the point of connection of said second vacuum tube anode with said isolating impedance to the input signal terminal of said deflection circuit means; the relative values of said resistor included in said first amplifier output circuit and said isolating impedance means resistance component being such as to isolate said first vacuum tube anode from signals delivered by said second signal amplifying means to an extent which prevents signals passed by said second amplifying means from producing undesirable disturbance in the picture produced by said kinescope picture reproducing means.

References Cited in the file of this patent

UNITED STATES PATENTS

| | | |
|---|---|---|
| 2,265,883 | Applegarth | Dec. 9, 1941 |
| 2,286,450 | White et al. | June 16, 1942 |
| 2,450,818 | Vermillion | Oct. 5, 1948 |
| 2,626,349 | Page | Jan. 20, 1953 |

OTHER REFERENCES

QST for July 1950, pages 11 and 12.